United States Patent [19]

Bye

[11] 4,397,687
[45] Aug. 9, 1983

[54] MIXING DEVICE AND METHOD FOR MIXING MOLTEN METALS

[75] Inventor: Richard Bye, Shorewood, Wis.

[73] Assignee: Massachusetts Institute of Technology, Cambridge, Mass.

[21] Appl. No.: 380,795

[22] Filed: May 21, 1982

[51] Int. Cl.$^3$ ............................................. C22B 21/06
[52] U.S. Cl. .................................. 75/68 R; 75/93 R; 266/235; 366/194; 366/328; 366/329; 366/343; 164/136; 164/437; 420/528; 420/590
[58] Field of Search ............. 266/235; 75/93 R, 68 R, 75/65 R, 61; 222/591, 593, 594; 164/133, 136, 437; 366/194, 328, 329, 343; 420/528, 590

[56] References Cited

U.S. PATENT DOCUMENTS

| | | | |
|---|---|---|---|
| 3,198,505 | 8/1965 | Amdur et al. | 266/235 |
| 3,902,544 | 9/1975 | Flemings et al. | 164/437 |
| 3,936,298 | 2/1976 | Mehrabian et al. | 148/400 |
| 3,954,455 | 5/1976 | Flemings et al. | 148/400 |
| 4,116,423 | 9/1978 | Bennett | 266/235 |
| 4,290,588 | 9/1981 | Pelton | 75/68 R |

Primary Examiner—M. J. Andrews
Attorney, Agent, or Firm—Arthur A. Smith, Jr.; Thomas J. Engellenner

[57] ABSTRACT

A mixing device (e.g., a stirrer) to ensure thorough mixing of metals and metal alloys comprising a generally rectangular solid and a series of off-side, but area-equivalent ports on each side of the axial center, wherein the size and number of ports on one side is different from the size and number of ports on the other side, the upper and lower limits of the ports being defined by oppositely opposed anguarly directed fin portions wherein the fins on one side of the axial center are directed in one direction and the fins on the other side of the axial center are directed in the opposite direction. The invention also embodies a method of mixing molten metals and alloys with the device.

8 Claims, 8 Drawing Figures

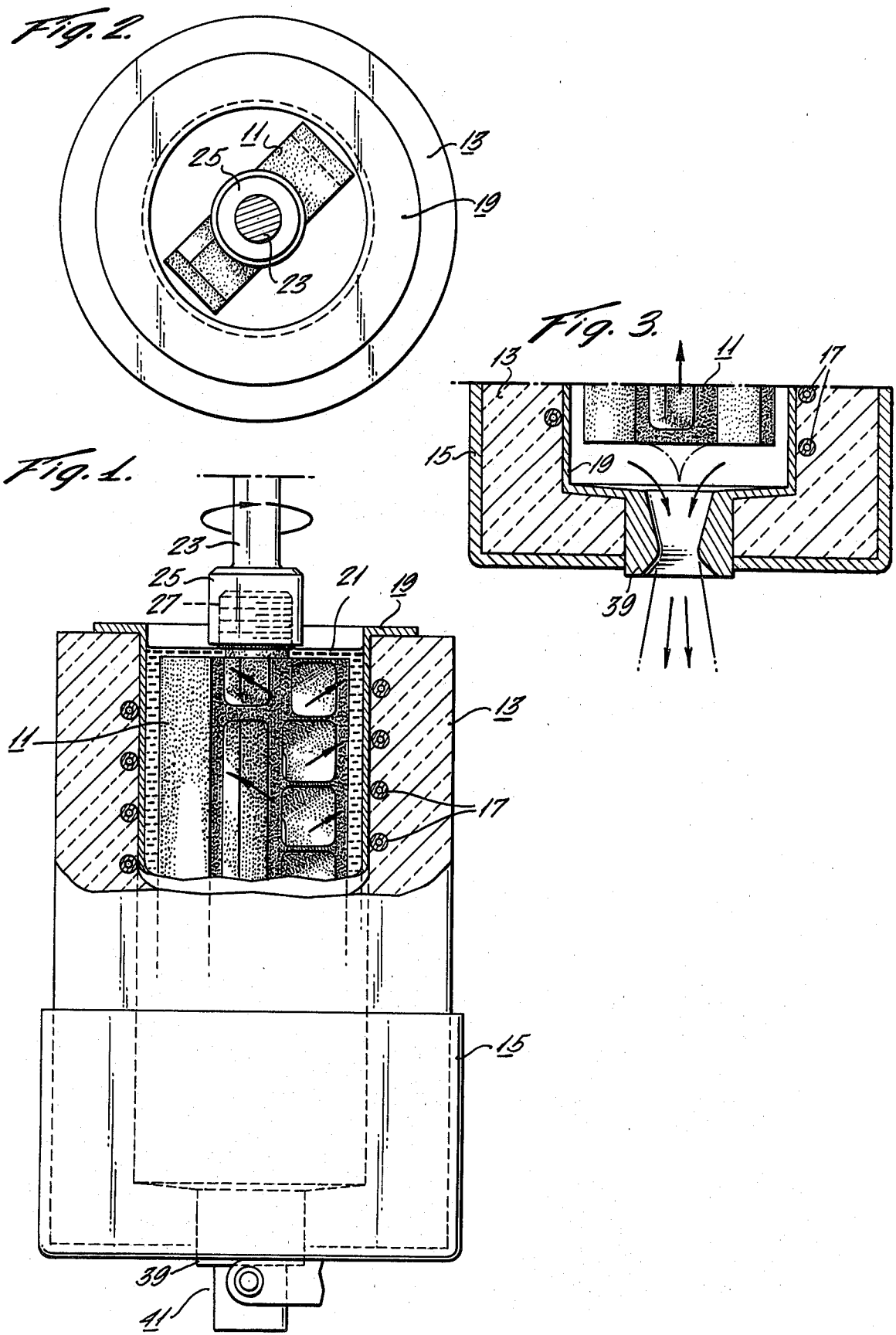

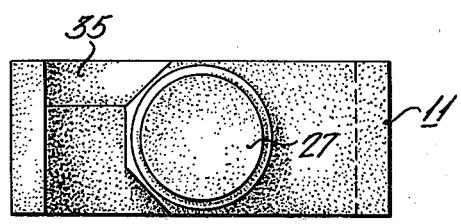
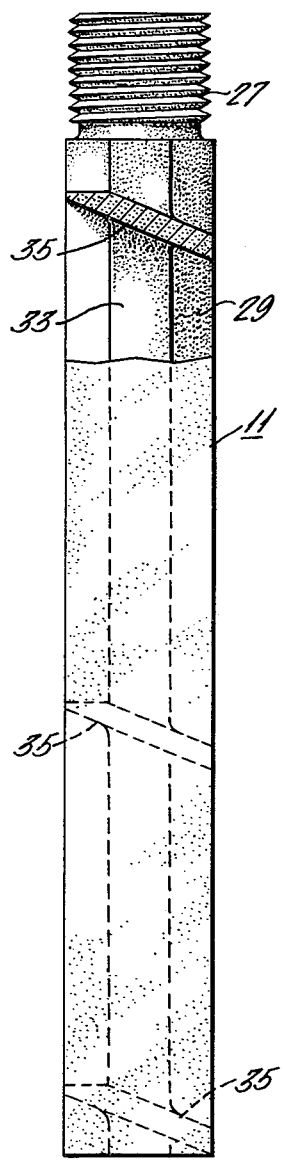
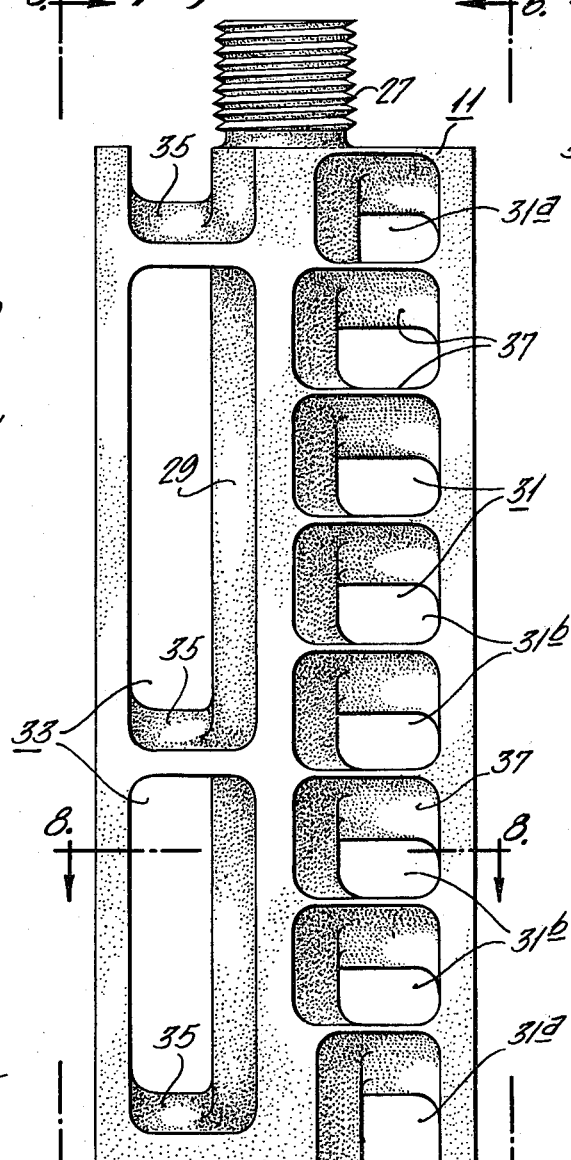
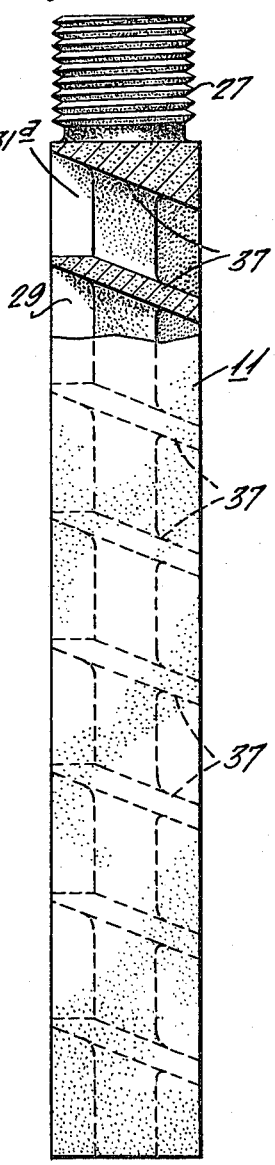
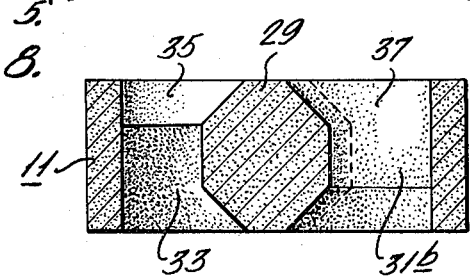

MIXING DEVICE AND METHOD FOR MIXING MOLTEN METALS

BACKGROUND OF THE INVENTION

This invention relates to an improved stirrer or mixing device and method of mixing which has particular value in mixing metals and metal alloys, particularly those metals and alloys which contain discrete degenerate dendritic primary solid particles and are to be subjected to casting techniques. U.S. Pat. Nos. 3,954,455, and 3,936,298 describe metal and metal alloy compositions which contain discrete degenerate dendritic primary solid particles and disclose the advantages for using such materials in casting techniques; e.g., lower temperatures, longer mold life, etc. In carrying out such casting methods it is necessary that the metal be thoroughly mixed while it is held in the mixing chamber so that when cast, the metal is uniform in composition throughout. Various types of stirrers, including the stirrer disclosed in U.S. Pat. No. 4,116,423 designed especially for metals containing degenerate dendritic solids, have not been totally satisfactory to obtain the necessary thorough mixing. The stirrer of the present invention provides mixing which not only effects agitation in a horizontal plane, but also circulates the molten metal in a vertical direction.

BRIEF STATEMENT OF THE INVENTION

In accord with the invention, a mixing device is provided comprising a generally rectangular solid constructed about a core member (preferably octagonal) and a series of ports on one side of the axial center and a series of ports of different size and number on the other side of the axial center, a plurality of said ports being off-center of the axial center, upper and lower limits of the ports being defined by oppositely opposed angularly directed fin portions wherein the fins on one side of the axial center are directed in one direction and the fins on the other side of the axial center are directed in the opposite direction, and the total face area of the ports on one side of the axial center being essentially the same total face area as the ports on the other side.

In the drawings:

FIG. 1 is a fragmentary front elevational view, with some parts broken away and in section, of a heated container for molten metal, showing the stirring paddle of this invention and the flow paths of the liquid through the various ports of the stirrer.

FIG. 2 is a plan view of the assembly shown in FIG. 1.

FIG. 3 is a fragmentary sectional elevational view of the lower portion of the container assembly shown in FIG. 1 showing the discharge of the liquid metal product.

FIG. 4 is an enlarged front elevational view of the stirrer of this invention.

FIG. 5 is a side elevational view of the stirrer shown in FIG. 4 as viewed along the line 5,5 of FIG. 4.

FIG. 6 is a side elevational view of the stirrer shown in FIG. 4. as viewed along the line 6,6 of FIG. 4.

FIG. 7 is a plan view of FIG. 4.

FIG. 8 is a sectional view through the stirrer taken on the line 8,8 of the FIG. 4.

DETAILED DESCRIPTION OF THE INVENTION

Referring now to FIG. 1 where the stirrer is shown in operation in a mixing chamber, the stirring paddle, shown generally as 11, is within a ceramic insulated chamber 13 seated in a lower housing retaining member 15 and heated electrically by heating coils 17. Within the thin-walled inner container 19 the fluid metal 21 is agitated by the stirrer 11 which is turned by a motor (not shown) attached to a driving shaft 23 at the upper end of the stirrer. The shaft may be fitted with a threaded socket 25 which accepts a threaded knob 27 at the top of the stirrer. At the bottom of the housing 15 is a plug and release mechanism shown generally as 41.

As indicated in the drawings, the stirrer 11 comprises generally a rectangular solid which is preferably machined from graphite, although other heat resistant materials may be used such as cast iron or ceramic material. The main portion of the rectangular solid, as illustrated, is constructed preferably about an octagonal core member, seen more clearly in FIG. 8 as 29 although other core member configurations are possible. A series of ports or chambers 31 and 33 are on both sides of the axial center and the upper and lower limits of the ports are defined by oppositely opposed, angularly directed fin sections 35 and 37 wherein the fins on one side (e.g., fins 35) are directed in one direction (upwardly) and the oppositely opposed fins (e.g., fins 37) are directed in the opposite direction (downwardly). These fins are best illustrated by FIG. 4 and FIG. 5 and FIG. 6, taken on lines 5—5 and 6—6 respectively of FIG. 4. The stirrer is shown in FIG. 1 in a position rotated 45° to the plane and when rotation is as shown by the arrow surrounding shaft 23, the flow of molten metal will be in the direction of the arrows shown in the ports, thus illustrating the lifting effect of the stirrer so that molten metal is mixed vertically as well as horizontally.

The number of ports on each side of the axial center of the rectangular solid is not critical, but for optimum performance it is important that a plurality of the ports be off-center from the central axis and this is evident from the drawings. FIG. 1 and FIG. 4 show this clearly and reference is now made to FIG. 4 where the ports 31b are offset from the top and bottom ports 31a which are centrally positioned with respect to the ports 33 in the opposite side. This off-set and assymetric arrangement provides for an improved lateral motion and results in a much more thorough mixing of the molten metal. It is also desirable that the total area of the port faces (i.e. the port openings) on one side be essentially the same as the total area of the port faces on the other side as this will enable a smooth flow of liquified metal through the ports. As a result of these parameters, this stirring device provides both radial and circumferential motion to the molten metal and it has been found in operation that little or no metal deposits on the device and it functions satisfactorily over long periods of time without maintenance. It is also desirable that the ports on one side be from about 3 to about 4 times the length of the ports on the other side. It has been found preferable for use in a melting furnace of about 4 inches diameter and about 11.5 inches high that from 6 to 8 ports on one side be used, most preferably 8 ports on one side as shown in FIG. 4 with about two longer ports on the other side.

At the bottom of furnace 13 in FIG. 3 a discharge port 39 enables molten metal to be discharged from the container. Any one of a number of conventional plugs or stopper means (not shown) may be used to plug the discharge port while the stirrer is in use.

As indicated, FIG. 2 is a plan view of the assembly shown in FIG. 1. FIG. 7 is a plan view of FIG. 4 and FIG. 8, as indicated is a sectional view taken along line 8—8 of FIG. 4 and shows the octagonal core and the off-center geometry of the port configuration at this section by means of the dashed line.

The invention also embodies a method of mixing molten metals and alloys with the above described device. In a preferred embodiment the method of the invention is of significant value for mixing those molten metals and alloys which contain discrete degenerate dendritic primary solid particles, particularly when such molten metals and alloys are to be removed from the mixing chamber and subjected to casting techniques, such as diecasting.

Due to the complete mixing of the molten metal, including the vertical mixing as well as horizontal mixing as described above, the molten metal removed from the furnace retains the discrete degenerate dendritic primary solids in a thoroughly dispersed condition for a time sufficient to enable a uniform casting to be made without air bubbles or other flaws.

The invention claimed is:

1. A mixing device to ensure thorough mixing of metals and metal alloys comprising a generally rectangular solid and a series of ports on each side of the axial center of said rectangular solid whose upper and lower limits are defined by oppositely opposed angularly directed fin portions wherein the fins on one side of said axial center are directed in one direction and the fins on the other side of said axial center are directed in the opposite direction and wherein a plurality of the ports on one side of said mixing device are off-center from the axial center and the total face area of the ports on the one side are essentially equal to the total face area of the ports on the other side.

2. The mixing device of claim 1 wherein said device is constructed of graphite.

3. The mixing device of claim 1 wherein the ports on one side are from about 3 to about 4 times the length of the ports on the other side.

4. The mixing device of claim 3 wherein the number of ports on one side is from about 6 to about 8 and about 2 to 3 on the other side.

5. A method for mixing molten metals and metal alloys in a melting furnace which comprises employing as a mixing device a generally rectangular solid having of a series of off-center ports on each side of the axial center of said rectangular solid whose upper and lower limits are defined by oppositely opposed angularly directed fin portions wherein the fins on one side of said axial center are directed in one direction and the fins on the other side of said axial center are directed in the opposite direction, whereby agitation is provided in both a horizontal and vertical direction and wherein the total face area of the ports on one side are essentially equal to the total face area of the ports on the other side.

6. The method of claim 5 wherein the molten metal or metal alloy contains discrete degenerate dendritic primary solid particles.

7. The method of claim 6 wherein the molten metal or metal alloy is withdrawn from said furnace and subjected to injection molding.

8. The method of claim 6 wherein the metal is an alloy of aluminum.

* * * * *